United States Patent Office 3,558,162
Patented Jan. 26, 1971

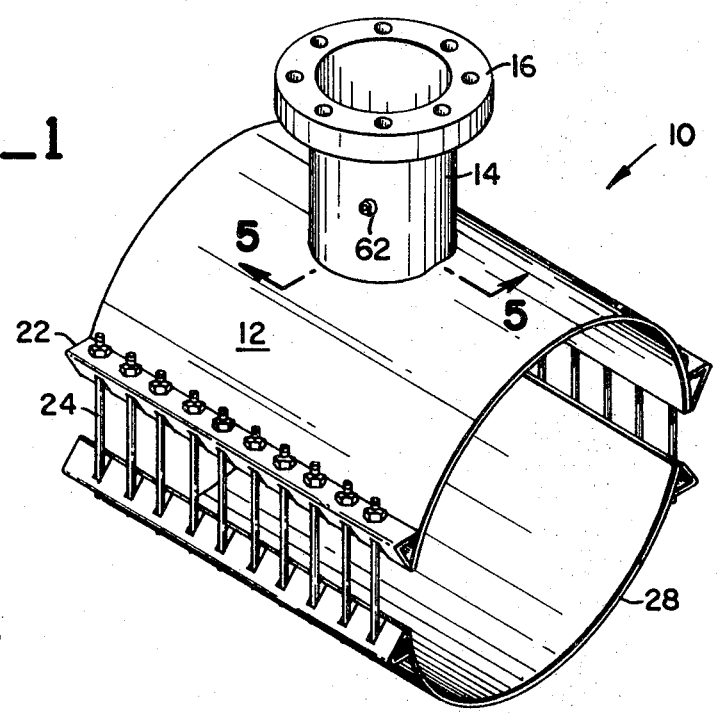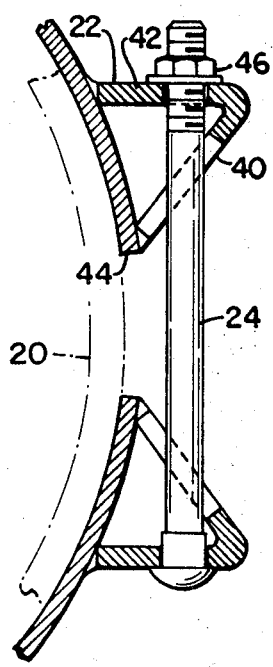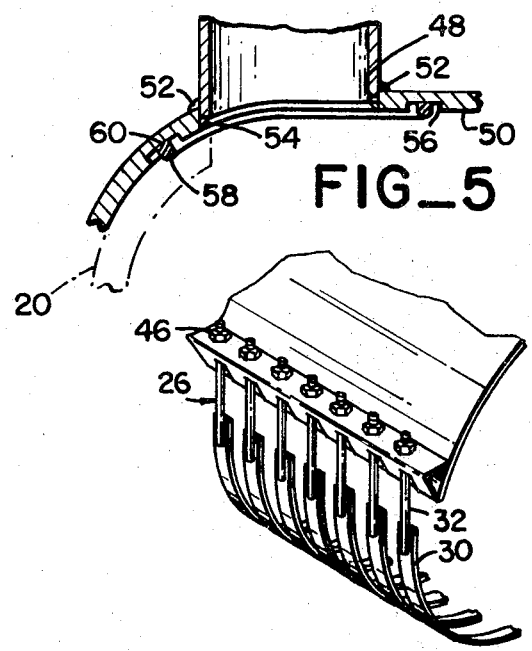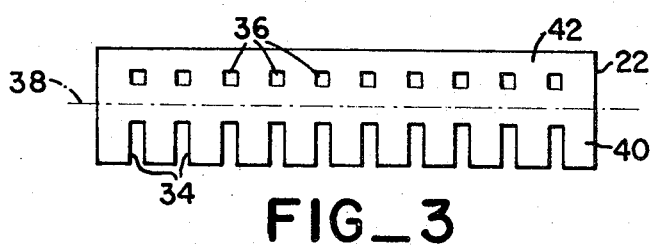

3,558,162
TAPPING SLEEVE
Peter E. Ferrai, South San Francisco, Calif., and Robert B. Williams, Texarkana, and Charles W. Livingston, Douglassville, Tex., assignors to Smith-Blair Inc., San Francisco, Calif., a corporation of California
Filed Nov. 18, 1968, Ser. No. 776,652
Int. Cl. F16l 41/00
U.S. Cl. 285—93                                    1 Claim

ABSTRACT OF THE DISCLOSURE

A tapping sleeve for large diameter conduits comprised of a curved upper body having an opening fixed to a tubular outlet member. The end portions of the body are provided with lug members for retaining bolts connected to a lower body member or bales for holding the sleeve on a pipe. The lug members are integral elongated metal pieces with separate rows of slots and openings that are aligned when each lug member is bent along a longitudinal line between the slots and openings. The upper body is constructed with a slot on its inner surface around said opening for a resilient sealing member that forms a fluid tight seal between the body section and the conduit to which the sleeve is attached.

---

This invention relates to an improved tapping sleeve for fluid conduit systems.

In connecting a large concrete asbestos cement or cast iron pipe, such as the type often used for sewer lines or water mains, with side lines or laterals, a large tapping sleeve is used. Such sleeves must be able to accommodate variations in the outside diameter which are characteristic of concrete pipe and yet they must be attachable thereto with sufficient strength to provide support for the pipe and to maintain a fluid tight seal around the tap opening. Such tapping sleeves must also be able to support heavy drilling equipment and a valve and to maintain the seal when the main conduit is tapped under pressure as in making a "wet tap." The tapping sleeve of the present invention solves these problems.

Heretofore, tapping sleeves for large conduits such as formed from concrete pipe were fabricated from a relatively large number of structural steel members which were cut to a predetermined size and shape, and then welded together. Many of the weldments required considerable grinding before being acceptable in the finished product. Also, such tapping sleeve structures were necessarily large and heavy in order to achieve adequate strength, and the fabrication and assembly of their many parts caused them to be expensive.

It is, therefore, another object of the present invention to provide a tapping sleeve that is particularly well adapted for ease and economy of manufacture.

More specifically, another object of the present invention is to provide a tapping sleeve for large pipe that is strong, durable and yet lighter, and has fewer component weldments than prior tapping sleeves.

Another object of the present invention is to provide an improved method for making a tapping sleeve for use on relatively large pipes that requires considerably less labor than the methods previously applied to tapping sleeves of similar size and which, therefore, makes possible the manufacture of tapping sleeves for considerably less time and expense.

Other objects, advantages and features of the present invention will become apparent from the following detailed description presented in conjunction with the drawings, in which:

FIG. 1 is a view in perspective of a tapping sleeve embodying the features of the present invention;

FIG. 2 is an enlarged view in section showing the lug portions on one side of the sleeve of FIG. 1;

FIG. 3 is a flat pattern of one lug member for the sleeve of FIG. 1;

FIG. 4 ins a fragmentary view in perspective of another form of tapping sleeve according to our invention; and FIG. 5 is a fragmentary view in section taken along line 5—5 of FIG. 1 and showing the sealing ring seat according to the present invention.

Referring to the drawing, FIG. 1 shows a tapping sleeve 10 embodying the principles of our invention which is used on large conduits such as concrete pipes for the purpose of connecting a lateral or branch line to the main. Generally, the tapping sleeve is comprised of an upper semicylindrical body member 12 on which is centrally located a radially extending tubular outlet member 14. The outlet member 14 may have an end flange 16, as shown, to facilitate its connection with a lateral pipe or it can also have a plain end for welding, threaded end, or a half coupling end depending on the type of connection that is to be made with a lateral. When the tapping sleeve is installed, an opening 18 is formed in the side of the main pipe 20 being tapped in alignment with the axis of the outlet 14 (see FIG. 5). Connected along each end of the body member 12 which is parallel to the central axis of the sleeve is a lug member 22 for holding a plurality of bolts 24 or bales 26 that are utilized to secure the sleeve to the pipe. In the embodiment of FIG. 1 the bolts are used in combination with a lower body member 28 which is also provided with lug members 22 along its end. Both the upper and lower body members are preferably formed from a suitable metal such as steel plate that is rolled to the desired curvature approximating the curvature of the pipe on which the sleeve is to be used.

In the slightly modified form of our sleeve, shown in FIG. 4, the lower body member is replaced by a plurality of the bales 26. The latter may each have a flattened straplike central portion 30 connected at both ends to cylindrical portions 32 with threaded ends that fit into the lugs 22 on the upper body member 12.

The lug members on the upper body member (and also on the lower body member, if used) comprise one important feature of our tapping sleeve 10.

Each lug member is formed from a single piece of material that is first cut to a predetermined shape and then bent along a longitudinal line before being attached, as by welding to the end of a curved body member. As shown in FIG. 3, each lug member 22 may be formed from an elongated, rectangular piece of material. Along one side are a plurality of slots 34 and spaced from each slot and aligned therewith along a line perpendicular to the longitudinal axis of the lug is a hole 36 having a width substantially equal to the width of the slot. The holes 36 are preferably square so as to receive a flat sided head portion of conventional carriage type blots. Between the longitudinally aligned holes and slots is a bend line, designated by the numeral 38, which separates a front portion 40 of the lug having the slots form a rear portion 42 having the aligned holes. When the lugs are formed, the front and rear portions 40 and 42 are bent to an acute angle (e.g. 40°–60°) along the line 38. Each lug is then attached, as by welding, to an end portion of a sleeve body member, the front lug portion 40 being attached at the edge 44 of the body member and the rear lug portion 42 being attached at a distance from the edge.

The rear portions of opposing lugs on the mating upper and lower sleeve sections are substantially parallel, as shown in FIG. 2. When the two body members of the sleeve shown in FIG. 1 are around the pipe, the holes 36 and slots 34 of opposing lugs are aligned to accept the bolts 24 and the rear lug portions form a bearing surface for either a fixed head on each bolt or for tightening nuts 46 threaded to its ends.

In the embodiment of FIG. 4, where the bales 26 are used in lieu of the second sleeve, the cylindrical bolt portions 32 extend through aligned pairs of slots and holes in lug member on the upper body member 12. A nut 46 threaded to the end of each bolt portion and bearing against the rear face of the lug member serves to tighten the bale and thus secure the sleeve on the pipe.

Before the upper body member has been formed to its semi-cylindrical shape, a central opening 48 is cut in it to receive the outlet 14. This opening has a diameter only slightly greater than the outlet diameter so that the outlet, when properly shaped at its inner end, will fit just within the opening 48 but slightly above the inner surface 50 of the upper body member. At the junction of the outlet member and the body member, as shown in FIG. 6, and outer weldment 52 and an inner weldment 54 are provided to connect these two members together. The inner weldment is purposely located between the end edge surface of the outlet member and the inner edge surface of the opening 48 so that when formed it can be ground down to a smooth fillet-like corner.

Spaced inwardly from the edge of the opening 48 in the upper body member on the inner surface thereof is a groove 56 for receiving a sealing ring 58. The thickness of the upper body member can be increased slightly when necessary to accommodate the groove. This groove may also be formed by some suitable procedure such as milling when the upper body member is still flat. The ring for the groove may be made of any suitable resilient material and has a generally circular cross-section with a flat side 60 that fits against the bottom of the groove and a thickness which is greater than the depth of the groove. The semicircular cross-sectional shape of the sealing ring provides a large contact area and a skidding effect that prevents rolling or a hang-up and assures the ring of staying in the groove 56 when the tapping sleeve is installed. Thus, when the body member is installed on a pipe the sealing ring will be deformed within the groove and provide a durable fluid-tight seal.

On the side of the outlet 14 is a boss 62 which is normally plugged but which can be connected to a small pipe when necessary. When the tapping sleeve is to be mounted on a line full of water, under pressure to facilitate the installation of a branch line, the upper and lower body members are first mounted in place and the fastening bolts are tightened. A gasketed blind flange or a valve is then attached to the outlet and a source of water under pressure is applied through the boss. This enables a hydrostatic pressure test to be made of the seal between the pipe being tapped and the upper sleeve body. If the seal is satisfactory and no leakage occurs, the conventional tapping valve and drilling machine can be installed to make the tapping hole in the pipe.

From the foregoing it should be apparent that the present invention provides a tapping sleeve for a large pipe that is relatively simple to fabricate since it requires few weldments and machining operations, yet it can be assembled with precision to provide a tapping device adaptable for use on a wide range of pipe sizes and types. To prevent corrosion all tapping sleeves like the one we have described must be coated with some protective material such as vinyl. The present invention provides a tapping sleeve that is particularly easy to coat since it can have relatively large slots and holes with accessible surfaces and few weldments, burrs, sharp corners that would hinder the application of such coatings.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

We claim:

1. A tapping sleeve and pipe connection comprising a curved metallic body member having an opening therein fitted against and partially around the pipe, a tubular outlet member fixed in said opening, sealing means around said opening between the member and pipe to seal escape of fluid from said opening, and means securing the body member against the pipe comprising lug members fixed to and extending axially along the edge zones of the member, each lug member comprising a pair of angularly disposed legs, a plurality of openings linearly disposed in one leg and a plurality of slots aligned with said openings defining tongues in the other leg, said lug members being fixed to the body member by welds securing the tongues to the edge of the body member and by welds securing the other leg to the surface of the body member, and fasteners extending through said slots and openings, said tubular outlet member having an opening through the wall thereof for admitting fluid under pressure to test the seal before tapping a hole through the pipe.

References Cited

UNITED STATES PATENTS

| 1,510,394 | 9/1924 | Frazier | 138—99 |
| 1,659,196 | 2/1928 | Fulton | 24—279 |
| 1,831,641 | 11/1931 | Skinner | 285—197 |
| 2,402,710 | 6/1946 | Tinnerman | 24—279 |
| 2,570,985 | 10/1951 | Riemenschneider et al. | 24—279X |
| 2,684,859 | 7/1954 | Longley | 285—199 |
| 2,997,316 | 8/1961 | Recht | 285—197X |

FOREIGN PATENTS

| 764,401 | 3/1934 | France | 285—197 |
| 191,944 | 1/1923 | Great Britain | 24—279 |

THOMAS F. CALLAGHAN, Primary Examiner

U.S. Cl. X.R.

24—277, 284; 285—197